United States Patent
Cherpeck

[11] Patent Number: 5,865,861
[45] Date of Patent: Feb. 2, 1999

[54] FUEL COMPOSITIONS CONTAINING POLYAMINES OF POLY(OXYALKYLENE) AROMATIC

[75] Inventor: Richard E. Cherpeck, Cotati, Calif.

[73] Assignee: Chevron Chemical Company LLC, San Francisco, Calif.

[21] Appl. No.: 995,595

[22] Filed: Dec. 22, 1997

[51] Int. Cl.$^6$ ........................................................ C10L 1/18
[52] U.S. Cl. .................................. 44/399; 41/428; 560/50
[58] Field of Search ........................ 44/399, 428; 560/50

[56] References Cited

U.S. PATENT DOCUMENTS

| | | |
|---|---|---|
| 2,714,607 | 8/1955 | Matter ..................... 260/471 |
| 2,714,608 | 8/1955 | Matter ..................... 260/471 |
| 2,714,609 | 8/1955 | Matter ..................... 260/471 |
| 2,714,610 | 8/1955 | Matter ..................... 260/471 |
| 3,149,933 | 9/1964 | Ley et al. . |
| 4,320,020 | 3/1982 | Lange . |
| 4,320,021 | 3/1982 | Lange . |
| 4,328,322 | 5/1982 | Baron ....................... 521/163 |
| 4,386,939 | 6/1983 | Lange . |
| 4,515,981 | 5/1985 | Otani et al. ................. 560/50 |
| 5,039,775 | 8/1991 | Oyaizu ....................... 528/68 |
| 5,081,295 | 1/1992 | Reardan et al. ............. 564/163 |
| 5,086,153 | 2/1992 | Oyaizu ....................... 528/68 |
| 5,090,914 | 2/1992 | Reardan et al. ............. 435/188 |
| 5,103,039 | 4/1992 | Reardan et al. ............. 560/33 |
| 5,157,099 | 10/1992 | Reardan et al. ............. 528/68 |
| 5,211,721 | 5/1993 | Sung et al. .................. 44/389 |
| 5,407,452 | 4/1995 | Cherpeck .................... 44/399 |

Primary Examiner—Jacqueline V. Howard
Assistant Examiner—Cephia D. Toomer
Attorney, Agent, or Firm—Claude J. Caroli

[57] ABSTRACT

A polyamine-containing poly(oxyalkylene) aromatic ester having the formula:

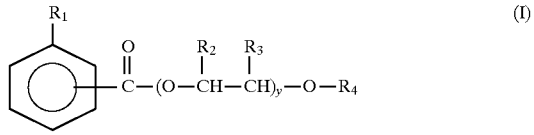

(I)

or a fuel-soluble salt thereof;
where $R_1$ is a polyamine moiety having about 2 to about 12 amine nitrogen atoms and about 2 to about 40 carbon atoms, wherein the polyamine moiety is connected to the aromatic ring through one of its amine nitrogen atoms, $R_2$ and $R_3$ are independently hydrogen or lower alkyl and each $R_2$ and $R_3$ is independently selected in each —O—$CHR_2$—$CHR_3$-unit; $R_4$ is hydrogen, alkyl having 1 to about 100 carbon atoms, phenyl, aralkyl having about 7 to about 100 carbon atoms or alkaryl having about 7 to about 100 carbon atoms, or an acyl group of the formula:

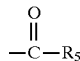

where $R_5$ is alkyl having 1 to about 30 carbon atoms, phenyl, aralkyl having about 7 to about 36 carbon atoms or alkaryl having about 7 to about 36 carbon atoms; and y is an integer from about 5 to about 100. The polyamine-containing poly(oxyalkylene) aromatic esters of the present invention are useful as fuel additives for the prevention and control of engine deposits.

25 Claims, No Drawings

FUEL COMPOSITIONS CONTAINING POLYAMINES OF POLY(OXYALKYLENE) AROMATIC

BACKGROUND OF THE INVENTION

1. Field of the Invention

This invention relates to polyamines of poly(oxyalkylene) aromatic esters and to fuel compositions containing polyamines of poly(oxyalkylene) aromatic esters. More particularly, this invention relates to poly(oxyalkylene) aromatic esters having a polyamine moiety on the aromatic ring and to the use of such compounds in fuel compositions to prevent and control engine deposits.

2. Description of the Related Art

It is well known that automobile engines tend to form deposits on the surface of engine components, such as carburetor ports, throttle bodies, fuel injectors, intake ports and intake valves, due to the oxidation and polymerization of hydrocarbon fuel. These deposits, even when present in relatively minor amounts, often cause noticeable driveability problems, such as stalling and poor acceleration. Moreover, engine deposits can significantly increase an automobile's fuel consumption and production of exhaust pollutants. Therefore, the development of effective fuel detergents or "deposit control" additives to prevent or control such deposits is of considerable importance and numerous such materials are known in the art.

For example, amino phenols are known to function as detergents/dispersants, antioxidants and anti-corrosion agents when used in fuel compositions. U.S. Pat. No. 4,320,021, issued Mar. 16, 1982 to R. M. Lange, for example, discloses amino phenols having at least one substantially saturated hydrocarbon-based substituent of at least 30 carbon atoms. The amino phenols of this patent are taught to impart useful and desirable properties to oil-based lubricants and normally liquid fuels. Similar amino phenols are disclosed in related U.S. Pat. No. 4,320,020, issued Mar. 16, 1982 to R. M. Lange.

Similarly, U.S. Pat. No. 3,149,933, issued Sep. 22, 1964 to K. Ley et al., discloses hydrocarbon-substituted amino phenols as stabilizers for liquid fuels.

U.S. Pat. No. 4,386,939, issued Jun. 7, 1983 to R. M. Lange, discloses nitrogen-containing compositions prepared by reacting an amino phenol with at least one 3- or 4-membered ring heterocyclic compound in which the hetero atom is a single oxygen, sulfur or nitrogen atom, such as ethylene oxide. The nitrogen-containing compositions of this patent are taught to be useful as additives for lubricants and fuels.

More recently, certain poly(oxyalkylene) esters have been shown to reduce engine deposits when used in fuel compositions. U.S. Pat. No. 5,211,721, issued May 18, 1993 to R. L. Sung et al., for example, discloses an oil soluble polyether additive comprising the reaction product of a polyether polyol with an acid represented by the Formula RCOOH in which R is a hydrocarbyl radical having 6 to 27 carbon atoms. The poly(oxyalkylene) ester compounds of this patent are taught to be useful for inhibiting carbonaceous deposit formation, motor fuel hazing, and as ORI inhibitors when employed as soluble additives in motor fuel compositions.

Poly(oxyalkylene) esters of amino- and nitrobenzoic acids are also known in the art. For example, U.S. Pat. No. 2,714,607, issued Aug. 2, 1955 to M. Matter, discloses polyethoxy esters of aminobenzoic acids, nitrobenzoic acids and other isocyclic acids. These polyethoxy esters are taught to have excellent pharmacological properties and to be useful as anesthetics, spasmolytics, analeptics and bacteriostatics. U.S. Pat. Nos. 2,714,608; 2,714,609; and 2,714,610, all issued to M. Matter, disclose similar polyethoxy esters.

Similarly, U.S. Pat. No. 5,090,914, issued Feb. 25, 1992 to D. T. Reardan et al., discloses poly(oxyalkylene) aromatic compounds having an amino or hydrazinocarbonyl substituent on the aromatic moiety and an ester, amide, carbamate, urea or ether linking group between the aromatic moiety and the poly(oxyalkylene) moiety. These compounds are taught to be useful for modifying macromolecular species such as proteins and enzymes. U.S. Pat. Nos. 5,081,295; 5,103,039; and 5,157,099; all issued to D. T. Reardan et al., disclose similar poly(oxyalkylene) aromatic compounds.

U.S. Pat. No. 4,328,322, issued Sep. 22, 1980 to R. C. Baron, discloses amino- and nitrobenzoate esters of oligomeric polyols, such as poly(ethylene) glycol. These materials are used in the production of synthetic polymers by reaction with a polyisocyanate. Similar materials are disclosed in U.S. Pat. No. 4,515,981, issued May 7, 1985 to K. Otani et al., and in U.S. Pat. Nos. 5,039,775 and 5,086,153, both issued to Y. Oyaizu.

U.S. Pat. No. 5,407,452, issued Apr. 18, 1995 to R. E. Cherpeck, discloses poly(oxyalkylene)aromatic esters containing a nitro, amino, N-alkylamino, or N,N-dialkylamino moiety on the aromatic ring. Compounds described were useful as fuel additives for the prevention and control of engine deposits.

It has now been discovered that poly(oxyalkylene) aromatic esters having a polyamine moiety on the aromatic ring are surprisingly useful for reducing engine deposits, especially intake valve deposits, when employed as fuel additives in fuel compositions.

SUMMARY OF THE INVENTION

The present invention provides novel polyamine-containing poly(oxyalkylene) aromatic ester compounds having the following formula and fuel-soluble salts thereof:

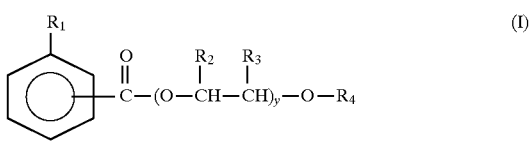

wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms, $R_2$ and $R_3$ are independently hydrogen or lower alkyl having 1 to about 6 carbon atoms and each $R_2$ and $R_3$ is independently selected in each —O—CHR$_2$—CHR$_3$— unit; $R_4$ is hydrogen, alkyl having 1 to about 100 carbon atoms, phenyl, aralkyl having about 7 to about 100 carbon atoms or alkaryl having about 7 to about 100 carbon atoms, or an acyl group of the formula:

wherein $R_5$ is alkyl having 1 to about 30 carbon atoms, phenyl, aralkyl having about 7 to about 36 carbon atoms or alkaryl having about 7 to about 36 carbon atoms; and y is an integer from about 5 to about 100.

The present invention also provides a fuel composition comprising a major amount of hydrocarbons boiling in the gasoline or diesel range and an effective deposit-controlling amount of a polyamine-containing poly(oxyalkylene) aromatic ester of Formula I above.

The present invention further provides a fuel concentrate comprising an inert stable oleophilic organic solvent boiling in the range of from about 150° F. (about 65° C.) to about 400° F. (205° C.) and from about 10 to about 70 weight percent of a polyamine-containing poly(oxyalkylene) aromatic ester of Formula I above.

Among other factors, the present invention is based on the discovery that poly(oxyalkylene) aromatic esters having a polyamine moiety on the aromatic ring are surprisingly useful for reducing engine deposits, especially on intake valves, when employed as fuel additives in fuel compositions.

DETAILED DESCRIPTION OF THE INVENTION

The compounds provided by the present invention are polyamine-containing poly(oxyalkylene) aromatic esters having the general formula:

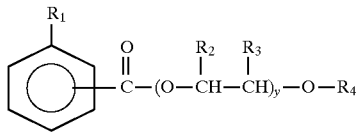

wherein $R_1$, $R_2$, $R_3$, $R_4$, and y are as defined above.

In Formula I, $R_1$ is a polyamine moiety having about 2 to about 12 amine nitrogen atoms and about 2 to about 40 carbon atoms, wherein the polyamine moiety is connected to the aromatic ring through one of its amine nitrogen atoms. More preferably, $R_1$ is a polyamine moiety derived from a polyalkylene polyamine containing about 2 to about 12 nitrogen atoms and about 2 to about 24 carbon atoms. Still more preferably, $R_1$ is a polyamine moiety derived from a polyalkylene polyamine having the formula:

wherein $R_6$ is an alkylene group having about 2 to about 6 carbon atoms and z is an integer from 1 to about 4. Most preferably $R_1$ is a polyamine moiety derived from ethylenediamine or diethylenetriamine.

Preferably, one of $R_2$ and $R_3$ is lower alkyl having 1 to about 3 carbon atoms and the other is hydrogen. More preferably, one of $R_2$ and $R_3$ is methyl or ethyl and the other is hydrogen. Most preferably, one of $R_2$ and $R_3$ is ethyl and the other is hydrogen.

$R_4$ is preferably hydrogen, alkyl having 1 to about 30 carbon atoms, or alkylphenyl having an alkyl group containing 1 to about 30 carbon atoms. More preferably, $R_4$ is hydrogen, alkyl having about 2 to about 24 carbon atoms, or alkylphenyl having an alkyl group containing about 2 to about 24 carbon atoms. Still more preferably, $R_4$ is hydrogen, alkyl having about 4 to about 12 carbon atoms or alkylphenyl having an alkyl group containing about 4 to about 12 carbon atoms. Most preferably, $R_4$ is alkylphenyl having an alkyl group containing about 4 to about 12 carbon atoms.

$R_5$ is preferably alkyl having about 4 to about 12 carbon atoms.

Preferably, y is an integer from about 8 to about 50. More preferably, y is an integer from about 10 to about 30.

A preferred group of polyamine-containing poly(oxyalkylene) aromatic esters of this invention are compounds of Formula I wherein $R_1$ is derived from ethylenediamine or diethylenetriamine; one of $R_2$ and $R_3$ is hydrogen and the other is methyl or ethyl; $R_4$ is hydrogen, alkyl having 1 to about 30 carbon atoms or alkylphenyl having an alkyl group containing 1 to about 30 carbon atoms; and y is about 8 to about 50.

A more preferred group of polyamine containing poly(oxyalkylene) aromatic esters are those of Formula I wherein $R_1$ is derived from ethylenediamine or diethylenetriamine; one of $R_2$ and $R_3$ is hydrogen and the other is methyl or ethyl; $R_4$ is hydrogen, alkyl having about 2 to about 24 carbon atoms or alkylphenyl having an alkyl group containing about 2 to about 24 carbon atoms; and y is about 8 to about 50.

A particularly preferred group of polyamine containing poly(oxyalkylene) aromatic esters are those of Formula I wherein $R_1$ is derived from ethylenediamine; one of $R_2$ and $R_3$ is hydrogen and the other is methyl or ethyl; $R_4$ is hydrogen, alkyl having about 2 to about 24 carbon atoms or alkylphenyl having an alkyl group containing about 2 to about 24 carbon atoms; and y is about 10 to about 30.

It is especially preferred that the polyamine group present in the aromatic ring of the poly(oxyalkylene) aromatic esters of this invention be situated in a para position relative to the poly(oxyalkylene) ester moiety.

The polyamine-containing poly(oxyalkylene) aromatic esters of the present invention will generally have a sufficient molecular weight so as to be non-volatile at normal engine intake valve operating temperatures (about 200°–about 250° C.). Typically, the molecular weight of the poly(oxyalkylene) aromatic esters will range from about 600 to about 10,000, preferably from about 1,000 to about 3,000.

Generally, the polyamine-containing poly(oxyalkylene) aromatic esters of this invention will contain an average of about 5 to about 100 oxyalkylene units; preferably, about 8 to about 50 oxyalkylene units; more preferably, about 10 to about 30 oxyalkylene units.

Fuel-soluble salts of the polyamine-containing poly(oxyalkylene) aromatic esters of the present invention can be readily prepared for those compounds containing a polyamine group and such salts are contemplated to be useful for preventing or controlling engine deposits. Suitable salts include, for example, those obtained by protonating the amino moiety with a strong organic acid, such as an alkyl- or arylsulfonic acid. Preferred salts are derived from toluenesulfonic acid and methanesulfonic acid.

Definitions

As used herein the following terms have the following meanings unless expressly stated to the contrary.

The term "amino" refers to the group: —$NH_2$.

The term "alkyl" refers to both straight- and branched chain alkyl groups.

The term "lower alkyl" refers to alkyl groups having 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, n-hexyl and the like.

The term "lower alkoxy" refers to the group —$OR_a$ wherein $R_a$ is lower alkyl. Typical lower alkoxy groups include methoxy, ethoxy, and the like.

The term "oxyalkylene unit" refers to an ether moiety having the general formula:

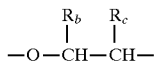

wherein $R_b$ and $R_c$ are each independently hydrogen or lower alkyl groups.

The term "poly(oxyalkylene)" refers to a polymer or oligomer having the general formula:

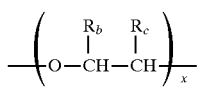

wherein $R_b$ and $R_c$ are as defined above, and x is an integer greater than 1.

When referring herein to the number of poly(oxyalkylene) units in a particular poly(oxyalkylene) compound, it is to be understood that this number refers to the average number of poly(oxyalkylene) units in such compounds unless expressly stated to the contrary.

The term "fuel" or "hydrocarbon fuel" refers to normally liquid hydrocarbons having boiling points in the range of gasoline and diesel fuels.

General Synthetic Procedures

The polyamine-containing poly(oxyalkylene) aromatic esters of this invention can be prepared by the following general methods and procedures. Those skilled in the art will recognize that where typical or preferred process conditions (e.g. reaction temperatures, times, mole ratios of reactants, solvents, pressures, etc.) are given, other process conditions may also be used unless otherwise stated. Optimum reaction conditions may vary with the particular reactants or solvents used, but one skilled in the art will be able to determine such conditions by routine optimization procedures.

Moreover, those skilled in the art will recognize that it may be necessary to block or protect certain functional groups while conducting the following synthetic procedures. In such cases, the protecting group will serve to protect the functional group from undesired reactions or to block its undesired reaction with other functional groups or with the reagents used to carry out the desired chemical transformations. The proper choice of a protecting group for a particular functional group will be readily apparent to one skilled in the art. In the present synthetic procedures, a hydroxyl group will preferably be protected, when necessary, as a benzyl or tert-butyldimethylsilyl ether. Various protecting groups and their introduction and removal are described, for example, in T. W. Greene and P. G. M. Wuts, "Protective Groups in Organic Synthesis", Second Edition, Wiley, New York, 1991, and references cited therein.

The polyamine containing poly(dxyalkylene) aromatic esters of the present invention having the formula:

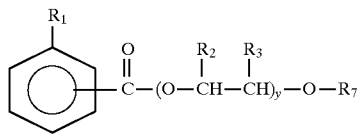

wherein $R_1$, $R_2$, $R_3$, and y are as defined above and $R_7$ is an alkyl, phenyl, aralkyl or alkaryl group, may be prepared by first esterifying an aromatic carboxylic acid having the formula:

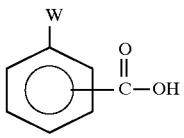

wherein W is a halogen, preferably fluorine, or nitro with a poly(oxyalkylene) alcohol having the formula:

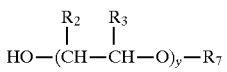

using conventional esterification reaction conditions, wherein $R_2$, $R_3$, $R_7$, and y are as defined above.

The resulting compound will have the formula below:

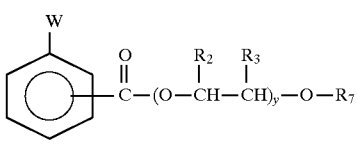

wherein W, $R_2$, $R_3$, $R_7$, and y are as defined above.

This reaction is typically conducted by contacting poly (oxyalkylene) alcohol V with about 0.90 to about 1.5 molar equivalents of aromatic carboxylic acid IV in the presence of acidic catalyst at a temperature in the range of about 70° C. to about 160° C. for about 0.5 to about 48 hours. Suitable acid catalysts for this reaction include, for example, p-toluenesulfonic acid, methanesulfonic acid, sulfuric acid and the like. The reaction may be conducted in the presence or absence of an inert solvent, such as toluene, xylene and the like. The water generated during this reaction may be continuously removed by conventional procedures, such as azeotropic distillation with an inert solvent, such as xylene.

Alternatively, the poly(oxyalkylene) aromatic esters of Formula VI may be prepared by reacting poly(oxyalkylene) alcohol V with an acid halide derived from aromatic carboxylic acid IV, such as an acid chloride or acid bromide.

Generally, the carboxylic acid moiety of IV may be converted into an acyl halide moiety by contacting IV with an inorganic acid halide, such as thionyl chloride, phosphorous trichloride, phosphorous tribromide, or phosphorous pentachloride; or with oxalyl chloride. Typically, this reaction will be conducted using 1 to about 5 molar equivalents of the inorganic acid halide or oxalyl chloride, either neat or in an inert solvent, such as diethyl ether, at a temperature in the range of about 20° C. to about 80° C. for 1 to about 48 hours. A catalyst, such as N,N-dimethylformamide, may also be used in this reaction.

Reaction of the acid halide derived from IV with poly (oxyalkylene) alcohol V provides a poly(oxyalkylene) aromatic ester of Formula VI. Typically, this reaction is conducted by contacting V with about 0.9 to about 1.5 molar equivalents of the acid halide in an inert solvent, such as toluene, dichloromethane, diethyl ether and the like, at a temperature in the range of about 25° C. to about 150° C. The reaction is generally complete in about 0.5 to about 48 hours. Preferably, the reaction is conducted in the presence of a sufficient amount of an amine capable of neutralizing the acid generated during the reaction, such as triethylamine, di(isopropyl)ethylamine, pyridine or 4-dimethylaminopyridine.

The aromatic carboxylic acids of Formula IV employed in the above-described procedures are either known compounds or can be prepared from known compounds by conventional procedures. Representative aromatic carboxylic acids suitable for use in these reactions include, but are not limited to, for example, 2-bromo-, 2-chloro-, 2-iodo-, 2-fluoro-, or 2-nitrobenzoic acid; or 4-bromo-, 4-chloro-, 4-iodo-, 4fluoro-, or 4-nitrobenzoic acid.

Preferably, the aromatic carboxylic acid is 4-fluorobenzoic acid.

The poly(oxyalkylene) alcohols of Formula V are also known compounds that can be prepared using conventional procedures. For example, suitable procedures for preparing such compounds are taught in U.S. Pat. Nos. 2,782,240 and 2,841,479, the disclosures of which are incorporated herein by reference.

Preferably, the poly(oxyalkylene) alcohols of Formula V are prepared by contacting an alkoxide or phenoxide metal salt having the formula:

$$R_7OM \quad \quad (VII)$$

wherein $R_7$ is as defined above and M is a metal cation, such as lithium, sodium, potassium and the like, with about 5 to about 100 molar equivalents of an alkylene oxide (an epoxide) having the formula:

(VIII)

$$R_2-HC \underline{\quad\quad} CH-R_3$$

wherein $R_2$ and $R_3$ are as defined above.

Typically, metal salt VII is prepared by contacting the corresponding hydroxy compound $R_7$ OH with a strong base, such as sodium hydride, potassium hydride, sodium amide and the like, in an inert solvent, such as toluene, xylene and the like, under substantially anhydrous conditions at a temperature in the range from about –10° C. to about 120° C. for about 0.25 to about 3 hours.

Metal salt VII is generally not isolated, but is reacted in situ with alkylene oxide VIII to provide, after neutralization, the poly(oxyalkylene) alcohol V. This polymerization reaction is typically conducted in a substantially anhydrous inert solvent at a temperature of about 30° C. to about 150° C. for about 2 to about 120 hours. Suitable solvents for this reaction, include toluene, xylene and the like.

Typically, the reaction is conducted at a pressure sufficient to contain the reactants and the solvent, preferably at atmospheric or ambient pressure.

The amount of alkylene oxide employed in this reaction will generally depend on the number of oxyalkylene units desired in the product. Typically, the molar ratio of alkylene oxide VIII to metal salt VII will range from about 5:1 to about 100:1; preferably, from about 8:1 to about 50:1, more preferably from about 10:1 to about 30:1.

Alkylene oxides suitable for use in this polymerization reaction include, for example, ethylene oxide; propylene oxide; butylene oxides, such as 1,2-butylene oxide (1,2-epoxybutane) and 2,3-butylene oxide (2,3-epoxybutane); pentylene oxides; hexylene oxides; octylene oxides and the like. Preferred alkylene oxides are propylene oxide and 1,2-butylene oxide.

In the polymerization reaction, a single type of alkylene oxide may be employed, e.g. propylene oxide, in which case the product is a homopolymer, e.g. a poly(oxypropylene) polymer. Copolymers are equally satisfactory and random copolymers can be prepared by contacting metal salt VII with a mixture of alkylene oxides, such as a mixture of propylene oxide and 1,2-butylene oxide, under polymerization conditions. Copolymers containing blocks of oxyalkylene units are also suitable for use in this invention. Block copolymers can be prepared by contacting metal salt VII with first one alkylene oxide, then others in any order, or repetitively, under polymerization conditions.

Poly(oxyalkylene) copolymers prepared by terminating or capping the poly(oxyalkylene) moiety with 1 to about 10 oxyethylene units, preferably about 2 to about 5 oxyethylene units, are particularly useful in the present invention, since these copolymers have been found to be more readily esterified than those having an alkyl branch in the terminal oxyalkylene unit. These copolymers may be prepared by contacting metal salt VII with an alkylene oxide of Formula VIII, such as 1,2-butylene oxide or propylene oxide, under polymerization conditions and then capping or terminating the resulting block of oxyalkylene units with oxyethylene units by adding ethylene oxide.

The poly(oxyalkylene) alcohol V may also be prepared by living or immortal polymerization as described by S. Inoue and T. Aida in *Encyclopedia of Polymer Science and Engineering*, Second Edition, Supplemental Volume, J. Wiley and Sons, New York, pages 412–420 (1989). These procedures are especially useful for preparing poly (oxyalkylene) alcohols of Formula V in which $R_2$ and $R_3$ are both alkyl groups.

As noted above, the alkoxide or phenoxide metal salt VII used in the above procedures is generally derived from the corresponding hydroxy compound, $R_7OH$. Suitable hydroxy compounds include straight- or branched-chain aliphatic alcohols having 1 to about 100 carbon atoms and phenols having the formula:

(IX)

wherein $R_8$ is an alkyl group having 1 to about 100 carbon atoms and $R_9$ is hydrogen; or $R_8$ and $R_9$ are both alkyl groups, each independently containing 1 to about 50 carbon atoms.

Representative examples of straight- or branched-chain aliphatic alcohols suitable for use in this invention include, but are not limited to, n-butanol; isobutanol; sec-butanol; t-butanol; n-pentanol; n-hexanol; n-heptanol; n-octanol; isooctanol; n-nonanol; n-decanol; n-dodecanol; n-hexadecanol (cetyl alcohol); n-octadecanol (stearyl alcohol); alcohols derived from linear $C_{10}$ to $C_{30}$ alpha olefins and mixtures thereof; and alcohols derived from polymers of $C_2$ to $C_6$ olefins, such as alcohols derived from polypropylene and polybutene, including polypropylene alcohols having about 9 to about 100 carbon atoms and polybutylene alcohols having to about 100 carbon atoms. Preferred straight- or branched-chain aliphatic alcohols will contain 1 to about 30 carbon atoms, more preferably about 2 to about 24 carbon atoms, and most preferably about 4 to about 12 carbon atoms.

Particularly preferred aliphatic alcohols are butanols.

The phenols of Formula IX may be monoalkyl-substituted phenols or dialkyl-substituted phenols. Monoalkyl-substituted phenols are preferred, especially monoalkylphenols having an alkyl substituent in the para position.

Preferably, the alkyl group of the alkylphenol will contain 1 to about 30 carbon atoms, more preferably about 2 to about 24 carbon atoms, and most preferably about 4 to about 12 carbon atoms. Representative examples of phenols suitable for use in this invention include, but are not limited to, phenol, methylphenol, dimethylphenol, ethylphenol, butylphenol, octylphenol, decylphenol, dodecylphenol, tetradecylphenol, hexadecylphenol, octadecylphenol, eicosylphenol, tetracosylphenol, hexacosylphenol, triacontylphenol and the like. Also, mixtures of alkylphenols may be employed, such as a mixture of $C_{14}$–$C_{18}$ alkylphenols, a mixture of $C_{18}$–$C_{24}$ alkylphenols, a mixture of $C_{20}$–$C_{24}$ alkylphenols, or a mixture of $C_{16}$–$C_{26}$ alkylphenols.

Particularly preferred alkylphenols are prepared by alkylating phenol with polymers or oligomers of $C_3$ to $C_6$ olefins, such as polypropylene or polybutene.

These polymers typically contain about 8 to about 100 carbon atoms, preferably about 10 to about 30 carbon atoms. An especially preferred alkylphenol is prepared by alkylating phenol with a propylene polymer having an average of about 4 units. This polymer has the common name of propylene tetramer and is commercially available.

As indicated above, the poly(oxyalkylene) aromatic esters of the present invention contain a polyamine moiety wherein the polyamine is connected to the aromatic ring through one of its amine nitrogen atoms which is covalently linked to the aforementioned poly(oxyalkylene) aromatic ester.

The polyamine component of the polyamine-containing poly(oxyalkylene) aromatic esters of this invention is preferably derived from a polyamine containing about 2 to about 12 amine nitrogen atoms and from about 2 to about 40 carbon atoms. Polyamines having a carbon-to-nitrogen ratio of from 1:1 to about 10:1 are particularly preferred.

In preparing the compounds of this invention using a polyamine where the various nitrogen atoms of the polyamine are not geometrically equivalent, several substitutional isomers are possible and each of these possible isomers is encompassed within this invention.

Suitable polyamines can have a straight- or branched-chain structure and may be cyclic or acyclic or combinations thereof. Generally, the amine nitrogen atoms of such polyamines will be separated from one another by at least two carbon atoms, i.e., polyamines having an animal structure are not suitable. The polyamine may also contain one or more oxygen atoms, typically present as an ether or a hydroxyl group.

A particularly preferred group of polyamines for use in the present invention are polyalkylene polyamines, including alkylene diamines. Such polyalkylene polyamines will typically contain about 2 to about 12 nitrogen atoms and about 2 to about 24 carbon atoms. Preferably, the alkylene groups of such polyalkylene polyamines will contain from about 2 to about 6 carbon atoms, more preferably from about 2 to about 4 carbon atoms.

Examples of suitable polyalkylene polyamines include ethylenediamine, propylenediamine, isopropylenediamine, butylenediamine, pentylenediamine, hexylenediamine, diethylenetriamine, dipropylenetriamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine and mixtures thereof.

Particularly suitable polyalkylene polyamines are those having the formula:

$$H_2N-(R_6NH)_z-H$$

wherein $R_6$ is a straight- or branched-chain alkylene group having about 2 to about 6 carbon atoms, preferably about 2 to about 4 carbon atoms, most preferably about 2 carbon atoms, i.e., ethylene (—$CH_2CH_2$—); and z is an integer from 1 to about 4, preferably 1 or about 2.

Particularly preferred polyalkylene polyamines are ethylenediamine, diethylenetriamine, triethylenetetraamine and tetraethylenepentamine. Most preferred are ethylenediamine and diethylenetriamine, especially ethylenediamine.

Also contemplated for use in the present invention are cyclic polyamines having one or more 5- to 6-membered rings. Such cyclic polyamines compounds include piperazine, 2-methylpiperazine, N-(2-aminoethyl) piperazine, N-(2-hydroxyethyl)piperazine, 1,2-bis-(N-piperazinyl)ethane, 3-aminopyrrolidine, N-(2-aminoethyl) pyrrolidine and the like. Among the cyclic polyamines, the piperazines are preferred.

Many of the polyamines suitable for use in the present invention are commercially available and others many be prepared by methods which are well known in the art. For example, methods for preparing amines and their reactions are detailed in Sidgewick's "*The Organic Chemistry of Nitrogen*", Clarendon Press, Oxford, 1966; Noller's "*Chemistry of Organic Compounds*", Saunders, Philadelphia, 2nd Ed., 1957; and Kirk-Othmer's "*Encyclopedia of Chemical Technology*", 2nd Ed., especially Volume 2, pp. 99–116.

The polyamine-containing poly(oxyalkylene) aromatic esters of Formula I wherein $R_4$ is hydrogen, may be prepared from compounds having the formula:

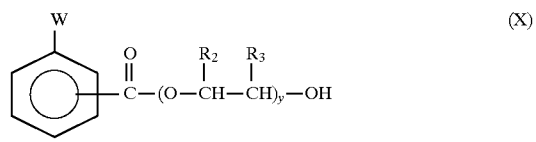
(X)

wherein W, $R_2$, $R_3$, and y are as defined above. The compounds of Formula X may be prepared from compounds of Formula VI wherein $R_7$ is a labile hydrocarbyl group, such as a benzyl or t-butyl group, by removing the hydrocarbyl group under appropriate conditions to provide a hydroxyl group. For example, compounds of Formula VI where $R_7$ represents a benzyl group may be prepared by employing a metal salt VII derived from benzyl alcohol in the above-described synthetic procedures. Cleavage of the benzyl ether using conventional hydrogenolysis procedures then provides a compound of Formula X. Other labile hydrocarbyl groups, such as a t-butyl group, may be similarly employed for those compounds having functional groups that are not compatible with hydrogenolysis conditions, such as nitro groups. t-Butyl ethers may be cleaved under acidic conditions using, for example, trifluoroacetic acid.

The poly(oxyalkylene) aromatic esters of Formula I wherein $R_4$ is an acyl group, i.e. compounds having the formula:

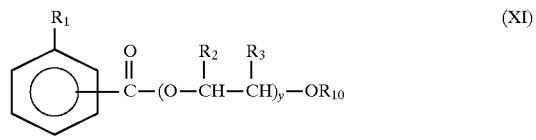
(XI)

wherein $R_1$, $R_2$, $R_3$, and y are as defined above and $R_{10}$ is an acyl group having the formula:

wherein $R_5$ is as defined above, may be synthesized from a compound of Formula X by acylating the terminal hydroxyl group of the poly(oxyalkylene) moiety with a suitable acylating agent.

Acylating agents suitable for use in this reaction include acid halides, such as acid chlorides and bromides; and carboxylic acid anhydrides. Preferred acylating agents include those having the formula: $R_5C(O)$—V, wherein $R_5$ is alkyl having 1 to about 30, preferably about 4 to about 12 carbon atoms, V is chloro or bromo; and the acid halide derivatives of aromatic carboxylic acid IV described hereinabove.

Representative examples of preferred acylating agents having the Formula $R_5C(O)$—V include acetyl chloride, propionyl chloride, butanoyl chloride, pivaloyl chloride, octanoyl chloride, decanoyl chloride and the like.

Typically, acylation of X is conducted by contacting X with about 0.95 to about 1.2 molar equivalents of the acylating agent in an inert solvent, such as toluene, dichloromethane, diethyl ether and the like, at a temperature in the range of about 25° C. to about 150° C. for about 0.5 to about 48 hours. When an acid halide is employed as the acylating agent, the reaction is preferably conducted in the presence of a sufficient amount of an amine capable of neutralizing the acid generated during the reaction, such as triethylamine, di(isopropyl)ethylamine, pyridine or 4-dimethylaminopyridine.

The polyamine-containing poly(oxyalkylene) aromatic esters of the present invention can then be achieved by reacting a poly(oxyalkylene) aromatic ester of Formula VI or Formula X (or a compound of Formula X which has been acylated) with a suitable polyamine, such as the polyamine of Formula II, above.

The reaction of compounds of Formula VI or X with compounds of Formula II will be apparent to those skilled in the art. Aromatic nucleophilic substitution reactions with amines have been reviewed by J. F. Bunnett and R. E. Zahler, "*Chemical Reviews*", 49, 273–319 (1951). Typically, such reactions may be conducted by contacting VI with 1 to about 25 equivalents of the polyamine of Formula II in an inert solvent such as toluene or chloroform or in the absence of solvent at a temperature range of about 25° C. to about 175° C. for about 0.5 to about 48 hours. The reaction can be conducted in the presence of a tertiary amine capable of neutralizing the acid generated during the reaction such as triethylamine or diisopropylethylamine or by employing excess of the polyamine. Typically, excess polyamine is employed to minimize any bis aromatic polyamines.

Fuel Compositions

The polyamine-containing poly(oxyalkylene) aromatic esters of the present invention are useful as additives in hydrocarbon fuels to prevent and control engine deposits, particularly intake valve deposits. Typically, the desired deposit control is achieved by operating an internal combustion engine with a fuel composition containing a polyamine-containing poly(oxyalkylene) aromatic ester of the present invention. The proper concentration of additive necessary to achieve the desired level of deposit control varies depending upon the type of fuel employed, the type of engine, and the presence of other fuel additives.

In general, the concentration of the polyamine-containing poly(oxyalkylene) aromatic esters of this invention in hydrocarbon fuel will range from about 50 to about 2,500 parts per million (ppm) by weight, preferably from about 75 to about 1,000 ppm. When other deposit control additives are present, a lesser amount of the present additive may be used.

The polyamine-containing poly(oxyalkylene) aromatic esters of the present invention may also be formulated as a concentrate using an inert stable oleophilic (i.e., dissolves in gasoline) organic solvent boiling in the range of about 150° F. to about 400° F. (about 65° C. to about 205° C.). Preferably, an aliphatic or an aromatic hydrocarbon solvent is used, such as benzene, toluene, xylene or higher-boiling aromatics or aromatic thinners. Aliphatic alcohols containing about 3 to about 8 carbon atoms, such as isopropanol, isobutylcarbinol, n-butanol and the like, in combination with hydrocarbon solvents are also suitable for use with the present additives. In the concentrate, the amount of the additive will generally range from about 10 to about 70 weight percent, preferably to about 50 weight percent, more preferably from about 20 to about 40 weight percent.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, or succinimides. Additionally, antioxidants, metal deactivators and demulsifiers may be present.

In diesel fuels, other well-known additives can be employed, such as pour point depressants, flow improvers, cetane improvers and the like.

A fuel-soluble, nonvolatile carrier fluid or oil may also be used with the polyamine containing poly(oxyalkylene) aromatic esters of this invention. The carrier fluid is a chemically inert hydrocarbon-soluble liquid vehicle which substantially increases the nonvolatile residue (NVR), or solvent-free liquid fraction of the fuel additive composition while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, synthetic polyoxyalkylene-derived oils, such as those described, for example, in U.S. Pat. No. 4,191,537 to Lewis, and polyesters, such as those described, for example, in U.S. Pat. Nos. 3,756,793 and 5,004,478 to Robinson and Vogel et al., respectively, and in European Patent Application Nos. 356,726 and 382,159, published Mar. 7, 1990 and Aug. 16, 1990, respectively.

These carrier fluids are believed to act as a carrier for the fuel additives of the present invention and to assist in removing and retarding deposits. The carrier fluid may also exhibit synergistic deposit control properties when used in combination with a polyamine containing poly(oxyalkylene) aromatic ester of this invention.

The carrier fluids are typically employed in amounts ranging from about 100 to about 5,000 ppm by weight of the hydrocarbon fuel, preferably from about 400 to about 3,000 ppm of the fuel. Preferably, the ratio of carrier fluid to deposit control additive will range from about 0.5:1 to about 10:1, more preferably from 1:1 to about 4:1, most preferably about 2:1.

When employed in a fuel concentrate, carrier fluids will generally be present in amounts ranging from about 20 to about 60 weight percent, preferably from about 30 to about 50 weight percent.

EXAMPLES

The following examples are presented to illustrate specific embodiments of the present invention and synthetic preparations thereof; and therefore these examples should not be interpreted as limitations upon the scope of this invention.

Example 1

Preparation of

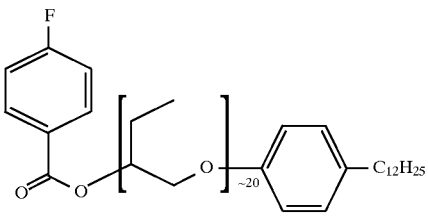

4-Fluorobenzoyl chloride (20.0 grams) was combined with 221.7 grams of α-hydroxy-ω-4-dodecylphenoxypoly (oxybutylene) having an average of 20 oxybutylene units (prepared essentially as described in Example 6 of U.S. Pat. No. 4,160,648) and anhydrous toluene (1 L). 4-Dimethylamino pyridine (16.1 grams) was then added and the resulting mixture was heated to reflux under nitrogen for 16 hours. The reaction was cooled to room temperature and diluted with 2 liters of diethyl ether. The organic layer was washed twice with saturated aqueous sodium bicarbonate solution and once with brine. The organic layer was dried over anhydrous magnesium sulfate, filtered and the solvents removed in vacuo to yield 221.1 grams of the desired product as a yellow oil.

Example 2

Preparation of

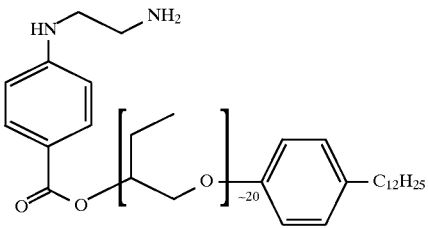

To a flask equipped with a magnetic stirrer, addition funnel, reflux condensor and nitrogen inlet was added ethylenediamine (10.2 mL) and the product from Example 1 (20.0 grams). The mixture was refluxed for sixteen hours, cooled to room temperature and diluted with 300 mL of diethyl ether. The organic phase was washed once with saturated aqueous sodium bicarbonate, twice with water, once with brine, dried over anhydrous sodium sulfate, filtered and concentrated in vacuo to yield 18.3 grams as an oil. The oil was chromatographed on silica gel, eluting with hexanelethyl acetate (7:3) followed by hexane/diethyl ether/methanollisopropylamine (40:40:15:5) to afford 10.2 grams of the desired product as a colorless oil. $^1$H NMR (CDCl$_3$, D$_2$O ) δ7.85 (d, 2H), 7.1–7.3 (m, 2H), 6.75–6.85 (m,2H), 6.55 (d, 2H), 5.05–5.15 (m,1H), 3.0–4.0 (m, 4H), 3.15–3.7 (m, 62H), 3.0 (t, 2H), 0.6–1.8 (m, 125H).

Example 3

Single-Cylinder Engine Test

The test compounds were blended in gasoline and their deposit reducing capacity determined in an ASTM/CFR single-cylinder engine test.

A Waukesha CFR single-cylinder engine was used. Each run was carried out for 15 hours, at the end of which time the intake valve was removed, washed with hexane and weighed. The previously determined weight of the clean valve was subtracted from the weight of the value at the end of the run. The differences between the two weights is the weight of the deposit. A lesser amount of deposit indicates a superior additive. The operating conditions of the test were as follows: water jacket temperature 200° F.; vacuum of 12 in Hg, air-fuel ratio of 12, ignition spark timing of 400 BTC; engine speed is 1,800 rpm; the crankcase oil is a commercial 30W oil.

The amount of carbonaceous deposit in milligrams on the intake valves is reported for each of the test compounds in Table I.

TABLE I

| Sample | Intake Valve Deposit Weight (in milligrams) | | |
|---|---|---|---|
| | Run 1 | Run 2 | Average |
| Base Fuel | 246.4 | 253.1 | 249.8 |
| Example 2[1] | 3.7 | 0.6 | 2.2 |

[1]At 75 parts per million actives (ppma).

The base fuel employed in the above single-cylinder engine tests was a regular octane unleaded gasoline containing no fuel detergent. The test compounds were admixed with the base fuel to give the concentrations indicated in the table.

The data in Table I illustrates the significant reduction in intake valve deposits provided by the polyamine-containing poly(oxyalkylene) aromatic esters of the present invention (Example 2) compared to the base fuel.

What is claimed is:

1. A compound of the formula:

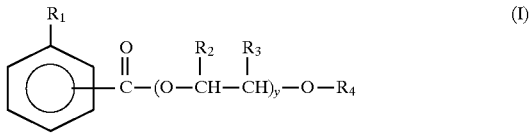

or a fuel-soluble salt thereof;

wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms;

$R_2$ and $R_3$ are independently hydrogen or lower alkyl having 1 to about 6 carbon atoms and each $R_3$ and $R_4$ is independently selected in each —O—CHR$_2$—CHR$_3$— unit;

$R_4$ is hydrogen, alkyl having 1 to about 100 carbon atoms, phenyl, aralkyl having about 7 to about 100 carbon atoms, alkaryl having about 7 to about 100 carbon atoms, or an acyl group having the formula:

wherein $R_5$ is alkyl having 1 to about 30 carbon atoms, phenyl, aralkyl having about 7 to about 36 carbon atoms or alkaryl having about 7 to about 36 carbon atoms; and y is an integer from about 5 to about 100.

2. The compound according to claim 1 wherein y is an integer ranging from about 8 to about 50.

3. The compound according to claim 2 wherein y is an integer ranging from about 10 to about 30.

4. The compound according to claim 1 wherein $R_1$ is a polyamine moiety derived from ethylenediamine or diethylenetriamine.

5. The compound according to claim 4 wherein $R_1$ is a polyamine moiety derived from is ethylenediamine.

6. The compound according to claim 1 wherein $R_4$ is hydrogen, alkyl having about 1 to about 30 carbon atoms, or alkylphenyl having an alkyl group containing about 1 to about 30 carbon atoms.

7. The compound according to claim 1 wherein one of $R_2$ and $R_3$ is lower alkyl having 1 to about 3 carbon atoms and the other is hydrogen.

8. The compound according to claim 7 wherein one of $R_2$ and $R_3$ is methyl or ethyl and the other is hydrogen.

9. The compound according to claim 6 wherein $R_4$ is alkylphenyl having an alkyl group containing about 4 to about 12 carbon atoms.

10. A fuel composition comprising a major amount of hydrocarbons boiling in the gasoline or diesel range and an effective deposit-controlling amount of a compound of the formula:

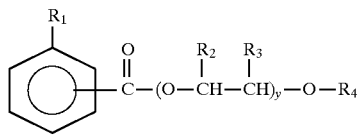
(I)

or a fuel-soluble salt thereof;
wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms;

$R_2$ and $R_3$ are independently hydrogen or lower alkyl having 1 to about 6 carbon atoms and each $R_3$ and $R_4$ is independently selected in each —O—CHR$_2$—CHR$_3$— unit;

$R_4$ is hydrogen, alkyl having 1 to about 100 carbon atoms, phenyl, aralkyl having about 7 to about 100 carbon atoms, alkaryl having about 7 to about 100 carbon atoms, or an acyl group having the formula:

wherein $R_5$ is alkyl having 1 to about 30 carbon atoms, phenyl, aralkyl having about 7 to about 36 carbon atoms or alkaryl having about 7 to about 36 carbon atoms; and y is an integer from about 5 to about 100.

11. The fuel composition according to claim 10 wherein y is an integer ranging from about 8 to about 50.

12. The fuel composition according to claim 11 wherein y is an integer ranging from about 10 to about 30.

13. The fuel composition according to claim 10 wherein $R_1$ is a polyamine moiety derived from ethylenediamine or diethylenetriamine.

14. The fuel composition according to claim 13 wherein $R_4$ is a polyamine moiety derived from ethylenediamine.

15. The fuel composition according to claim 10 wherein $R_4$ is hydrogen, alkyl having about 1 to about 30 carbon atoms, or alkylphenyl having an alkyl group containing about 1 to about 30 carbon atoms.

16. The fuel composition according to claim 10 wherein one of $R_2$ and $R_3$ is lower alkyl having 1 to about 3 carbon atoms and the other is hydrogen.

17. The fuel composition according to claim 16 wherein one of $R_2$ and $R_3$ is methyl or ethyl and the other is hydrogen.

18. The fuel composition according to claim 15 wherein $R_4$ is alkylphenyl having an alkyl group containing about 4 to about 12 carbon atoms.

19. The fuel composition according to claim 10 wherein said composition contains about 50 to about 2,500 parts per million by weight of said compound.

20. The fuel composition according to claim 10 wherein said composition further contains about 100 to 5,000 parts per million by weight of a fuel soluble, non-volatile carrier fluid.

21. A method for reducing engine deposits in an internal combustion engine comprising operating an internal combustion engine with the fuel composition of claim 10.

22. A fuel concentrate comprising an inert stable oleophilic organic solvent boiling in the range of from about 150° F. to about 400° F. and from about 10 to about 70 weight percent of a compound of the formula:

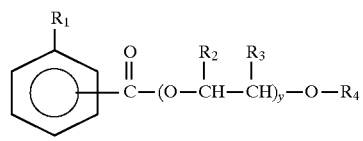

or a fuel-soluble salt thereof;
wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms;

$R_2$ and $R_3$ are independently hydrogen or lower alkyl having 1 to about 6 carbon atoms and each $R_2$ and $R_3$ is independently selected in each —O—CHR$_2$—CHR$_3$— unit;

$R_4$ is hydrogen, alkyl having 1 to about 100 carbon atoms, phenyl, aralkyl having about 7 to about 100 carbon atoms, alkaryl having about 7 to about 100 carbon atoms, or an acyl group having the formula:

wherein $R_5$ is alkyl having 1 to about 30 carbon atoms; phenyl, aralkyl having about 7 to about 36 carbon atoms or alkaryl having about 7 to about 36 carbon atoms; and y is an integer from about 5 to about 100.

23. The fuel concentrate according to claim 22 wherein $R_1$ is a polyamine moiety derived from ethylenediamine or diethylenetriamine; one of $R_2$ and $R_3$ is hydrogen and the other is methyl or ethyl; $R_4$ is hydrogen, alkyl having 1 to about 30 carbon atoms or alkylphenyl having an alkyl group containing 1 to about 30 carbon atoms; and y is about 8 to about 50.

24. The fuel concentrate according to claim 23 wherein $R_4$ is hydrogen, alkyl having about 2 to about 24 carbon atoms or alkylphenyl having an alkyl group containing about 2 to about 24 carbon atoms.

25. The fuel concentrate according to claim 24 wherein $R_1$ is a polyamine moiety derived from ethylenediamine; and $R_4$ is alkyl phenyl having an alkyl group containing about 4 to about 12 carbon atoms.

* * * * *